United States Patent [19]

Kickhofel

[11] Patent Number: 4,567,664
[45] Date of Patent: Feb. 4, 1986

[54] MEASURING GAGE FOR INTERNAL AND EXTERNAL SPLINES OF A WORKPIECE

[75] Inventor: Max A. Kickhofel, Troy, Mich.

[73] Assignee: Invo-Spline, Inc., Warren, Mich.

[21] Appl. No.: 595,521

[22] Filed: Mar. 30, 1984

[51] Int. Cl.[4] .............................................. G01B 5/12
[52] U.S. Cl. ................... 33/147 K; 33/178 R
[58] Field of Search ............ 33/178 R, 178 B, 147 K, 33/147 R, 147 H, 147 M, 148 R, 179.5 E, 199 R

[56] References Cited

U.S. PATENT DOCUMENTS

| 2,016,659 | 10/1935 | Tydeman ........................ 33/178 R |
| 2,223,889 | 12/1940 | Harley ........................... 33/178 B X |
| 2,561,534 | 7/1951 | Parker et al. ..................... 33/147 M |
| 3,882,604 | 5/1975 | Macklyn .......................... 33/147 K |

FOREIGN PATENT DOCUMENTS

| 223981 | 7/1910 | Fed. Rep. of Germany .... 33/178 R |
| 881063 | 1/1943 | France .......................... 33/178 A |

OTHER PUBLICATIONS

One Sheet Brochure Entitled "Indicating Spline Gauges", Fischbacher Hauptstrasse 150, Postfach 1160, D-8500 Nurnberg 55, Frenco Verzahnungslehren GmbH.

Two Sheet Brochure Entitled "Indicating Spline Gages", Fischbacher Hauptstrasse 150, Postfach 1160, D-8500 Nurnberg 55, Frenco Verzahnungslehren GmbH.

Primary Examiner—Harry N. Haroian
Attorney, Agent, or Firm—Cullen, Sloman, Cantor, Grauer, Scott & Rutherford

[57] ABSTRACT

A measuring gage for internal and external splines of a workpiece employs a pair of opposed aligned gage pins with hardened balls respectively on their outer ends for registry with internal splines of a workpiece and upon their inner ends for registry with the external splines of a workpiece and with the balls lying in a single plane for operative engagement with the workpiece splines. Longitudinal movement of one of the gage pins is adapted to control axial movement of a plunger upon a dial indicator directly or through a linkage for comparing the dimensions of the workpiece spline with respect to a set master size. In gaging external splines, one of the gage pins forms a part of the dial indicator plunger.

26 Claims, 10 Drawing Figures

MEASURING GAGE FOR INTERNAL AND EXTERNAL SPLINES OF A WORKPIECE

BACKGROUND OF THE INVENTION

Heretofore in checking sizes of internal and external splines of a workpiece, measuring pins have been employed to contact the recpective splines along their longitudinal surfaces. The difficulty of using only pins is that often the gaging of the internal or external splines of workpieces is time consuming and inaccurate.

SUMMARY OF THE INVENTION

An important feature of the present invention is to employ opposed, aligned and spaced gage pins, with tungsten carbinde balls, secured upon their inner ends, for gaging exterior splines and upon their outer ends, for gaging interior splines and wherein the opposed hardened balls contact the workpiece splines in a single plane and not along the longitudinal surfaces thereof.

As a further feature, movement of one of the balls and connected gage pin inwardly or outwardly relative to the other ball and gage pin, modifies the center distance between the balls. Upon assembly of the gage with respect to an internally or externally splined workpiece or part, such difference in center distance is transmitted directly or indirectly to the plunger of the dial indicator, or indirectly through a linkage to the dial indicator plunger, so as to provide a visual indication and measurement of the workpiece splines, internal or external, as compared to the zero setting of the dial indicator, with respect to a master spline of known size.

An important feature is to provide a floating relation of the splined locator for self-centering and alignment, with an internal or external spline of a workpiece and wherein at least one of the balls, upon a gage pin, is adapted for transmitting relative movements between the balls, to the plunger on a dial indicator, for measuring the internal or external splines of a workpiece or part and to compare the dimensions of said splined part with a master of known dimension.

It is an important feature to provide a spline gage for fast and accurate measurement of splined parts, either for final inspection or "on the job" measuring of splined parts to maintain quality and reduce scrap.

As a further feature, the measuring gage for external splines of a part or workpiece includes a floating ring mounting the spaced opposed gage pins and balls which is self-centering, relative to the splined part.

As a further feature, the dial indicator has a spring loaded plunger, with one of the carbide balls secured thereto, for a direct visal indication and measurement of the external splines of a workpiece, with respect to a master of known spline dimension.

Another feature provides a measuring gage for the external splines of a part, wherein there is provided an internally splined hardened locator and attached thereto an apertured cap, having an annular flange spaced radially outward of a cylindrical shank upon the locator body to define a chamber within which is loosely mounted a floating ring and wherein the opposed gage pins with spaced mounting balls thereon extend into the bore of the internally splined locator for indicating the measurement of an exteriorly splined workpiece projected thereinto.

As a further feature, the mesuring gage for external or internal splines includes operative means by which the pointer of the dial indicator may be zeroed with respect to the splines of a master of known size to provide a zero reading upon the dial indicator. The introduction of a splined workpiece to be gaged will provide a visual indication to the dimension of the workpiece splines as compared with the known dimension of the splines of a master.

An important feature is to provide a measuring gage for the internal splines of a workpiece and wherein there are arranged an opposed pair of spaced, aligned gage pins, each mounting at their outer end a tungsten carbide ball and with one of the gage pins secured to the shank of the gage and the other gage pin radially adjustable thereon wherein changes in the center distance between the respective tungsten carbide balls, on application of the interior splines of a workpiece over a corresponding exterior splined locator sleeve, is transmitted by a suitable linkage for effecting corresponding axial movements of the plunger of a dial indicator for measuring the dimensions of the interior splines of a workpiece.

As another feature, the dial indicator is adapted to further measure tapers, crown, hollow and in and out roundness of workpiece splines.

These and other objects and features will be seen from the following Specification and claims in conjunction with the appended drawings.

THE DRAWINGS

It will be understood that the above drawings illustrate merely preferred embodiments of the invention and that other embodiments are contemplated within the scope of the claims hereafter set forth.

DETAILED DESCRIPTION OF AN EMBODIMENT OF THE INVENTION

Figure 1:
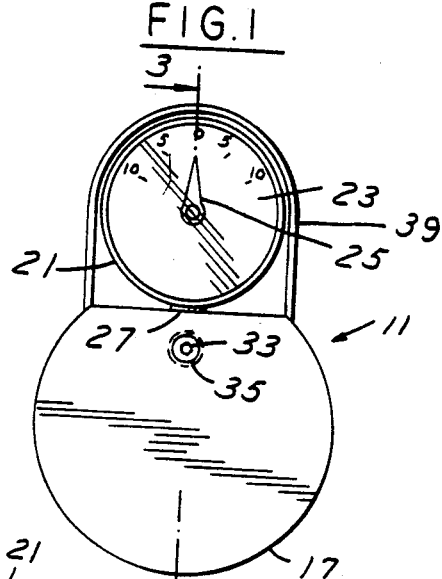
FIG. 1 is a front elevational view of a measuring gage for the internal splines of a workpiece or part.
Figure 2:
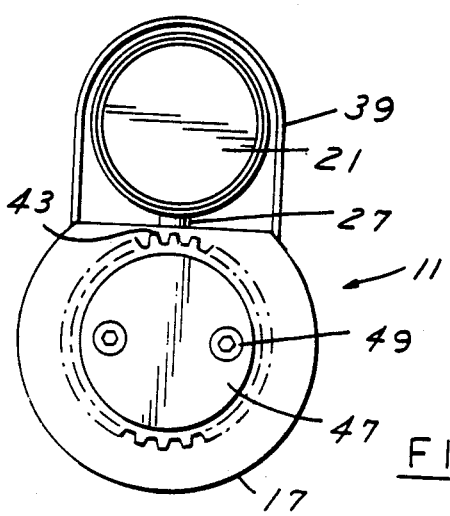
FIG. 2 is a rear elevational view thereof.
Figure 3:
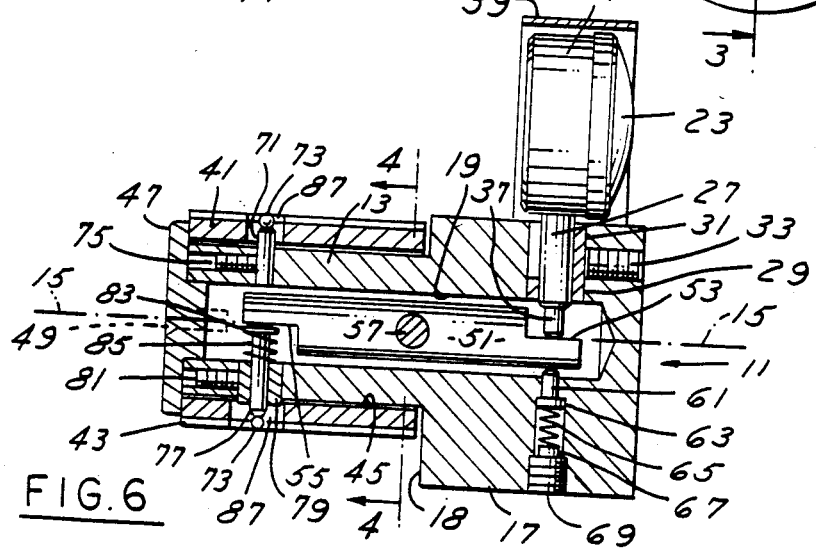
FIG. 3 is a longitudinal section taken in the direction of arrows 3—3 of FIG. 1.
Figure 6:
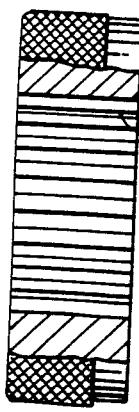
FIG. 6 is a partly sectioned right side elevational view thereof.

Referring to the drawings, FIGS. 1 through 6, a measuring gage for internal splines of a workpiece or part is designated at 11, FIG. 1 and includes a cylindrical shank 13, FIG. 3, having a central longitudinal axis 15, and upon one end of the shank 13 the body 17, sometimes referred to as a floating body. In the preferred embodiment, the shank 13 and body 17 are constructed of aluminum, with the body 17 being of increased diameter relative to said shank 13 defining stop shoulder 18, FIG. 3. Longitudinal bore 19 is formed in the shank 13 upon axis 15 extending into body 17 and opening on the other end of the shank.

Dial indicator 21, including calibrated dial 23 and pointer 25, of a conventional construction, includes mounting shank 27 which is mounted and supported upon body 17. A split bushing 29 extends through radial bore 31 in the body 17, communicates with bore 19 and supportably receives dial indicator shank 27 which is secured thereto by the axial set screw 33. The set screw is threaded within axial bore 35, FIG. 1, providing access thereto of an Allan wrench for adjusting the set screw 33.

Figure 8:
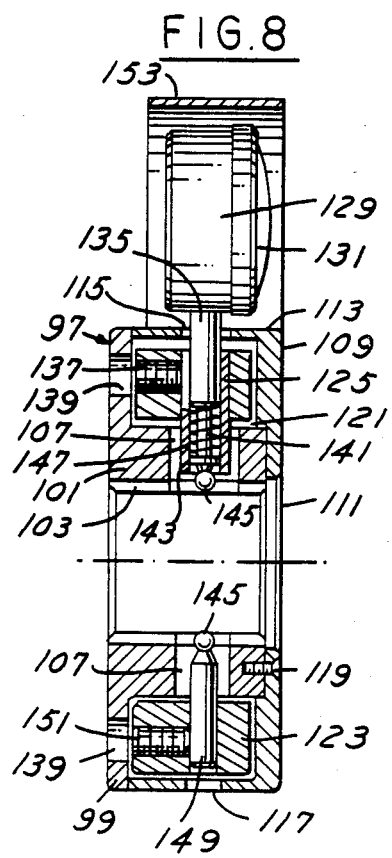
FIG. 8 is a central vertical section thereof taken in the direction of arrows 8—8 of FIG. 7.
Figure 9:
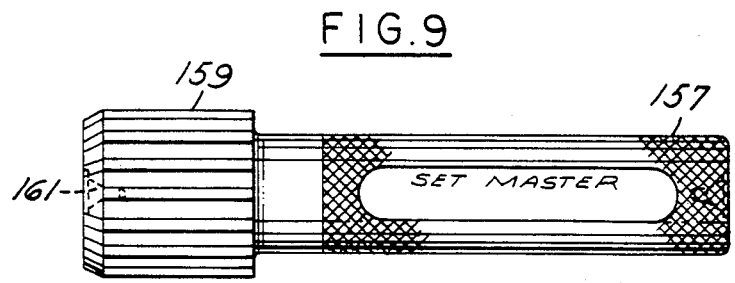
FIG. 9 is a side elevational view of the set master used with the external measuring gage of FIG. 7 for providing a zero reading upon the dial indicator.

Plunger 37, of a conventional construction, is normally spring biased radially outward into bore 19 using a coil spring similar to the coil spring 147 shown in FIG. 8.

Guard 39 loosely overlies and protectively encloses dial indicator 21 and its lower ends is suitably secured to body 17 by fasteners or welding, FIG. 1.

Elongated spline locator sleeve 41 of a hardened steel includes a series of elongated longitudinal splines 43, and upon its interior a longitudinal bore 45 loosely receiving cylindrical shank 13. Locator sleeve 41 at one end is arranged adjacent stop shoulder 18 on body 17 and at its opposite end is retained upon the shank 13 by cap 47 which has an outer diameter less than the diameter of the locator sleeve 41, FIG. 3. In the illustrative embodiment retainer cap 47 has an axial boss which is projected into bore 19, with the cap 47 secured to shank 13 by a pair of fasteners 49, FIG. 2.

The elongated axle 51, in a preferred embodiment, cylindrical in form, is loosely positioned within bore 19 and has at one end, control face 53 which is upwardly facing and in registry with longitudinal axis 15. Upon the opposite end of axle 51, there is provided a downturned actuator face 55 also arranged upon the central longitudinal axis 15 of bore 19.

Figure 4:
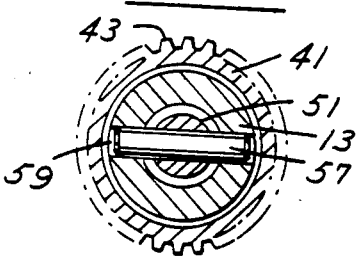
FIG. 4 is a vertical section taken in the direction of arrows 4—4 of FIG. 3.

Transverse pivot pin 57 is loosely disposed through axle 51 with its ends snugly positioned within transverse bore 59 in shank 13, FIG. 4. As shown in FIG. 3, axle 51 extends substantially the length of bore 19 with the control face 53, projected into body 17 in registry with plunger 37 of the dial indicator 21.

A zero setting pin 61, having an annular stop flange 63 is aligned with plunger pin 37, is spaced therefrom and engages the side of axle 51 opposite from control face 53. Radial adjustable Allen plug or set screw 69 is threaded into body 17 coaxially of zero setting pin 61. Coil compression spring 65 is loosely positioned within bore 67 in the body 17 normally biasing zero setting pin 61 against one side of axle 51 and in opposition to the spring biased plunger pin 37.

Radially extending gage pin 71 is adjustably secured by axial set screw 75 upon shank 13 and projects radially outward thereof and loosely within the radial bore 87, of which a pair of said bores 87 are formed transversely through locator sleeve 41, FIG. 3. Hardened ball 73, preferably of tungsten carbide, is brazed onto the outer end of gage pin 71 and is normally positioned adjacent the outer diameter of longitudinal splines 43 of the locator sleeve 41.

Mounted upon shank 13, axially aligned with and spaced from gage pin 71 is a yieldable gage pin 77 guidably positioned within bushing 79. The bushing 79 is adjustably secured for radial adjustment within the shank 13 by the axialset screw 81. An additional hardened ball 73, preferably of tungsten carbide, is brazed onto the outer end of yieldable gage pin 77 and normally located at the outer diameter of splines 43 of locator sleeve 41.

Contactor 83, generally covex in shape, is mounted across the inner end of gage pin 77 and is normally in engagement with actuator face 55. Coil compression spring 85 extends around gage pin 77 and is interposed between bushing 79 and contactor 83 for normally maintaining the gage pin 77 in operative contact with axle actuator face 55.

The outer end of the yieldable gage pin 77 extends loosely through one of the pair of opposed radial bores 87, FIG. 3. The corresponding hardened balls 73 upon the respective gage pins 71 and 77, are adapted for operative registry with splined bore 91, upon a set master 89 of known size. The master 89 is initially positioned over locator sleeve 41, in operative registry with balls 73 to assist in providing a zero indication of pointer 25, upon calibrated dial 23 of dial indicator 21.

Figure 5:
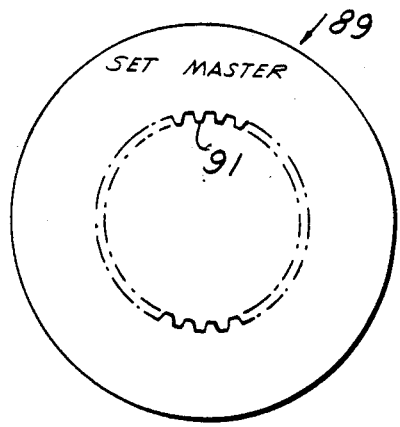
FIG. 5 is a front view of a set master of a known size to facilitate zero setting of the dial indicator.

For this purpose, with the balls 73 in registry with the splined bore 91 of set master 89, FIG. 5, there will be limited pivotal movement of the axle 51 with respect to transverse pivot pin 57 which intersects axis 15. When pointer 25, FIG. 1, moves away from zero, the zero setting pin 61 is adjusted by tightening or loosening set screw 69 and applying pressure to one end of axle 51 opposite from control face 53. The adjustment of the zero setting pin 61 is continued until the pointer 25 is in registry with the zero upon dial 23.

Thereafter, the spline measuring gage 11 is used by projecting the locator sleeve 41 into the internally splined bore of a workpiece or part, the dimensions of which are to be measured and compared with the internal splines 91 of the set master 89 of a known and predetermined dimension.

Should there be any deviation as to dimensions of the internal splines of the workpiece or part to be measured, its deviation will show up upon the dial 23 of the dial indicator 21 with the pointer 25 moving clockwise or counter-clockwise with respect to the zero indication thereon.

OPERATION

In operation, the set master 89, is first assembled over the splined hardened locator 41 and the dial indicator 21 is set to a zero reading. Thereafter, with the master 89 removed, the spline locator sleeve 41 is inserted into the internal splined bore fo a part to be measured, with the exact part size thereof shown upon the dial indicator 21 for comparison with the master size.

The present measuring gage for internal splines, shown at 11 in FIG. 1, is adapted to measure size, taper, crown, hollow and out of roundness of the workpiece or part splines.

This provides a fast and accurate means of measuring undersize or oversize of the interior splines, of a workpiece or part, to indicate whether the workpiece has a dimension substantially in accordance with the known dimension of the set master to which it is compared.

In the operation of the present measuring gage, a more complete measurement of the workpiece splines is achieved since the respective tungsten carbine balls 73 contact the part through a single plane and not along its longitudinal surface.

The set master 89 is of a specific size as to the internal splines 91 and is used for comparing a part size to that master of known dimension.

As shown in FIG. 3, there is a floating relationship between spline locator 41 and its supporting shank 13 upon which it is mounted for limited radial adjustments, relative thereto and wherein only one of the pair of opposed aligned gage pins 71 and 77, is movable in responding to the internal splines of a workpiece.

By this construction and since there is a measurement of the center distance between the respective balls 73, in effect, the locator sleeve 41 floats, with respect to the gage shank 13 and body 17, so that there is a self-centering of the locator sleeve 41, with respect to the internally splined workpiece to be gaged. Any variation from the dimensions, from the zero reading on the dial indicator 21, is transmitted through the pivotal axle 51 to the plunger 37 on dial indicator 21. This provides a visual indication of the measurement of the internally splined workpiece as compared with the known size of a set master to which the dial indicator was initially zeroed.

MODIFICATION

Figure 7:
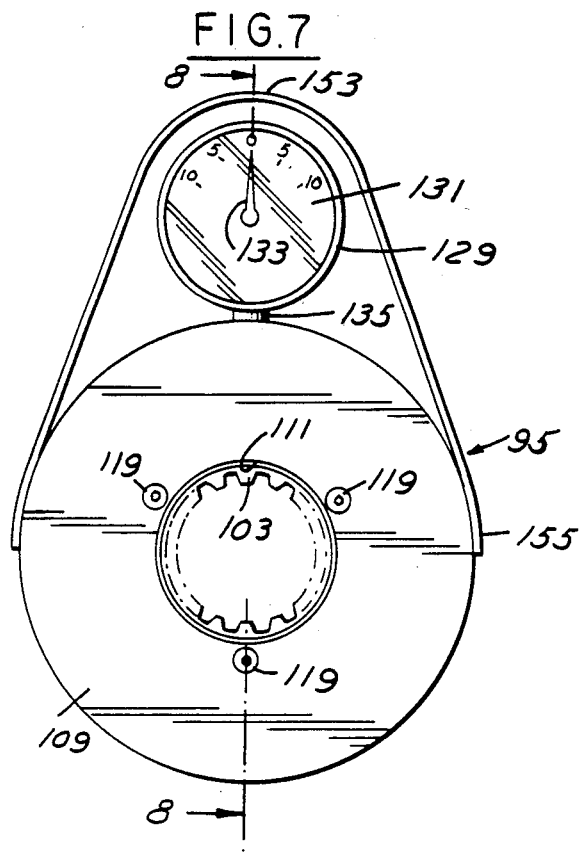
FIG. 7 is a front elevational view of a modified measuring gage for an externally splined workpiece or part.

Referring to FIGS. 7 through 10, a measuring gage for external splines of a workpiece or part, is generally indicated at 95, FIG. 7, and includes a hardened spline locator 97, preferably constructed of hardened steel, and which includes a circular body 99 having upon one side thereof a cylindrical shank 101. The shank 101 has an interiorly splined bore 103 arranged upon a central longitudinal axis 105.

Opposed transverse bores 107 are formed through shank 101 in communication with the splined bore 103. Circular cap 109, preferably of steel, has a central aperture 111 of greater diameter than splined bore 103 and an annular flange 113 which has formed therethrough a pair of opposed radial apertures 115 and 117, FIG. 2.

Cap 109, having a diameter corresponding to body 99, is secured to shank 101 by a plurality of fasteners 119, with the inner edge of flange 113 in cooperative engaging registry with body 99. Body 99, shank 101, circular cap 109 and its flange 113, together define a circular chamber 121, which is rectangular in cross-section shape, and within which is positioned the floating ring 123 of similar cross-sectional shape. In the illustrative and preferred embodiment, the ring 123 is constructed of aluminum. Radially arranged split bushing 125 extends through ring 123 and radially inward through a substantial portion of transverse bore 107, adjacent splined bore 103.

The dial indicator 129, of a conventional construction, includes a calibrated dial 131, a pointer 133 and a cylindrical mount shank 135. The dial indicator 129 is mounted upon the splined locator 97. Mount shank 135 extends through flange aperture 115, FIG. 2, and down into split bushing 125 in ring 123 and is adjustably secured therein by the radially extending set screw 137, which may have an Allen socket. A suitable axial aperture 139 is formed through body 99 for access of a wrench to set screw 137.

Plunger gage pin 141 is movably positioned within bushing 125 and at its outer end has an annular stop flange 143 guidably engaging the bushing 125. A hardened ball 145, preferably of tungsten carbide, is brazed onto the inner end of plunger gage pin 141. Coil compression spring 147 surrounds plunger gage pin 141 within the bushing 125 and is interposed between shank 135 and stop flange 143. In the illustrative embodiment, compression spring 147 is set for a two pound pressure and is adapted to normally bias the ball 145 radially inward, with respect to the splined bore 103 of locator 97.

Radial gage pin 149 is spaced from and aligned with plunger gage pin 141 and is adjustably mounted within and upon floating ring 123. A portion of the pin 141 extends radially inward through bore 107 an upon its inner end has brazed thereto a hardened ball 147, preferably of tungsten carbide.

Gage pin 149 is radially adjustable with respect to the floating ring 123 upon adjustment of the axial set screw 151. The screw 151 may be used for obtaining a zero setting of the dial indicator 129 when the exterior splined head 159 of the set master 157 is projected into splined bore 103.

Since the diameter and the dimensions of the exterior splines 159 of the set master 157 are known, there is thus provided a means by which for that particular size of exterior splines as at 159, the dial indicator 129 can be zeroed by radial adjustment of gage pin 149.

Since the gage pin 149 is mounted upon the floating ring 123, of rectangular cross-section, and since the plunger gage pin 141 is indirectly supported upon the same floating ring 123, radial adjustment of shank 135 with respect to bushing 125, also provides a means for obtaining a zero adjustment of the dial indicator 129 when the set master 157 and the splined head 159 thereon are assembled into the splined bore 103, FIG. 8.

Figure 10:
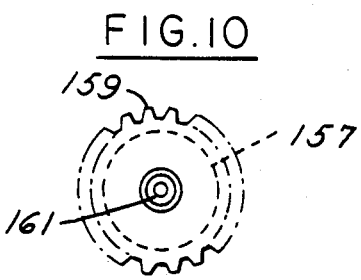
FIG. 10 is an end view thereof.

As shown in FIG. 10, the set master may have a series of removable splined heads 159 of different known sizes, axially secured to the set master 157 by fastener 161.

In operation, a set master 157 and its splined head 159 is first assembled into the splined bore 103 of the measuring gage 95 to permit zero setting adjustment of the dial indicator 129 and its pointer 133, with respect to the calibrated dial 131.

Thus the measuring gage 95 is pre-set for measuring the exterior spline of a workpiece or part as compared to the known dimension upon the master splined head 159.

The splined part to be measured is then inserted into the splined bore 103 of the spline locator 97 and the reaction of the hardened balls 145, with respect to the workpiece splines, is transmited through floating ring 123 and through the plunger gage pin 141 of dial indicator 129. This will provide an exact part size on the dial indicator 129 as compared with the set master 157, FIG. 9.

Here also the opposed spaced carbine balls 145, are adapted to contact opposite sides of the splines of the workpiece, in a single plane to allow for complete measurement of the workpiece splines and thus provide a simple reading upon the dial indicator as to the size of the workpiece spline as compared with the set master. The present measuring gage may also be used for measuring taper, crown, hollow and out of roundness, as well as size.

In view of the floating nature of the ring 123, mounting the respective opposed, aligned gage pins 149 and 141, there is provided an automatic self-centering of the floating ring 123 which is adapted for longitudinal as well as limited transverse movements within chamber 121. To the extent that the ring 123 floats within spline locator 97 and its cap 109, it is seen that there will be corresponding movements of the dial indicator 129 which is fixedly connected thereto.

Having described my invention, reference should now be had to the following claims:

I claim:

1. A measuring gage for internal splines comprising a cylindrical shank having a longitudinal central axis;
   a body of increased diameter on one end of said shank, there being a longitudinal bore in said shank on said axis opening on the other end of said shank and extending into said body;

an elongated axle within said bore intermediate its end pivotally mounted upon said shank of a transverse axis intersecting said longitudinal axis;

oppositely directed control and actuator faces on opposite ends of said axle respectively coplanar with said longitudinal axis;

a dial indicator having a calibrated dial and pointer mounted upon said body and having a depending spring biased plunger extending into said bore and bearing against said axle control face;

adjustable spring means upon said body aligned with said plunger engaging one side of said axle opposite from said control face to provide a zero reading upon said dial indicator;

an exteriorly splined hardened locator sleeve loosely mounted upon, concentric to and retained upon said shank and having a pair of opposed radial bores;

a pair of opposed aligned gage pins mounted upon said shank extending transversely outward and into said bores;

and a hardened ball secured upon the outer end of each pin, loosely positioned within said bores and extending to the periphery of said splined sleeve;

one gage pin being adjustably secured to said shank, and the other gage pin being yieldably mounted upon said shank with its inner end biased against said axle actuator face, said balls responding to the opposed interior splines of a splined workpiece when said splined sleeve is inserted therein to provide a visible indication upon said dial indicator.

2. In the measuring gage of claim 1, said axle being cylindrical.

3. In the measuring gage of claim 1, the pivotal mounting of said axle including a pivot pin extending transversely through said axle with its ends extending into and anchored upon said shank.

4. In the measuring gage of claim 1, the mounting of said dial indicator including a cylindrical shank having a bore depending from said dial indicator projected down into and secured to said body, said plunger being movably mounted within and projecting from said indicator shank.

5. In the measuring gage of claim 4, the securing of said indicator shank including a split bushing within said body, receiving said shank, and a set screw threaded into said body transversely of and retainingly engaging said indicator shank.

6. In the measuring gage of claim 1, said adjustable spring means including a zero setting pin aligned with said plunger;

an adjustable set screw in said body aligned with said pin;

and a coiled compression spring in said body interposed between said pin and said set screw.

7. In the measuring gage of claim 1, said locator sleeve being adapted for projection into an interiorly splined master of a known size, said spring means being adjustable to provide a zero setting of said pointer on said dial, whereby the successive projection of said locator sleeve and balls down into and engaging a splined workpiece, said other gage pin operably engaging said axle positioning said plunger so that said pointer provides a visual comparison of the size of said workpiece splines with said master splines;

said dial indicator being further adapted to measure tapers, crown, hollow and out of roundness of said workpiece splines.

8. In the measuring gage of claim 1, said opposed balls contacting said workpiece splines through a single plane, there being a floating self-aligning relation of said splined sleeve relative to the splines of said workpiece.

9. In the measuring gage of claim 1, said body defining with said shank a stop shoulder;

a sleeve retainer cap centered over said other end of said shank, of a diameter less than said splined sleeve, and secured to said shank, said splined sleeve being loosely interposed and retained between said stop shoulder and cap.

10. In the measuring gage of claim 1, said shank and body being of aluminum, said splined sleeve being of hardened steel and said balls being of tungsten carbide, brazed onto said pins respectively.

11. In the measuring gage of claim 1, the securing of said one gage pin upon said shank including a set screw threaded axially into said shank retainingly engaging said one gage pin.

12. In the measuring gage of claim 1, the yieldable mounting of said other gage pin including a transverse apertured bushing adjustably secured within said shank;

said other gage pin extending through said bushing and on its inner end having a contactor engaging said actuator face;

and a coiled spring upon said other pin interposed in compression between said bushing and contactor.

13. In the measuring gage of claim 12, said bushing being radially ajustable relative to said shank to regulate the compression in said spring.

14. In the measuring gage of claim 1, a guard of inverted U-shape loosely surrounding and protectively enclosing said dial indicator and at its free ends secured to said body.

15. A measuring gage for the external splines of a workpiece comprising a hardened spline locator including a circular body and a cylindrical shank connected thereto, there being an interiorly splined bore extending through said body and shank having a central longitudinal axis and a first pair of opposed radial bores in said shank communicating with said splined bore;

a centrally apertured cap mounted upon and secured to said shank including an annular flange engaging said body;

said body, shank, cap and flange defining an annular chamber;

a floating ring loosely nested within said chamber;

a dial indicator having a calibrated dial and pointer overlying said cap and mounted upon said ring, and having a depending spring biased plunger pin extending radially inward into one of said radial bores;

a gage pin aligned with and opposed to said plunger pin mounted upon, adjustably secured to and extending radially inward of said ring and into the other of said radial bores;

a hardened ball secured upon the inner ends of each pin loosely positioned within said radial bores and extending to said splined bore;

said balls operably engaging and responding to the opposed exterior splines of a splined workpiece when projected into said splined bore, the ball on said plunger pin on axial movements thereof providing a visible indication on said dial indicator.

16. In the measuring gage of claim 15, there being a second pair of opposed radial bores in said flange aligned with said first pair of bores, the mountings of said dial indicator including a cylindrical shank having a bore depending from said dial indicator, projected through one of said second radial bores and secured to said ring, said plunger pin being movably mounted within and projecting from said indicator shank, the other of said second radial bores being in alignment with said gage pin.

17. In the measuring gage of claim 16, the securing of said indicator shank including a split axial bushing receiving said shank extending radially inward of said ring and adjustably secured thereto, said bushing extending into one of said first pair of bores, said plunger pin being guidably positioned within said bushing.

18. In the measuring gage of claim 17, the securing of said dial indicator shank to said ring including an axial set screw in said ring operatively engaging said bushing.

19. In the measuring gage of claim 15, the securing of said gage pin to said ring including an axial set screw threaded into said ring and operatively engaging said gage pin;

radial adjustment of said gage pin relative to a splined master of known size projected into said splined bore providing a zero reading on said dial indicator.

20. In the measuring gage of claim 18, said plunger pin having an annular stop flange adjacent its outer end guidably positioned within said bushing;

and a coil compression spring within said bushing receiving said plunger pin and interposed between said dial indicator shank and said stop flange, normally biasing said plunger pin and ball thereon radially inward into said splined bore.

21. In the measuring gage of claim 15, the splined bore of said indicator being adapted to receive an exteriorly splined master of a known size, said gage pin being radially adjustable upon said ring and said ring floating within said chamber and transversely adjustable therein, to provide a zero setting of said pointer whereby on successive projection of a splined workpiece into said splined bore operatively engaging said balls the radial position of said ring and said plunger pin is adjusted and said pointer provides a visual comparison of the size of said workpiece splines with said master splines;

said dial indicator being further adapted to measure taper, crown, hollow and out of roundness of said workpiece splines.

22. In the measuring gage of claim 15, said opposed balls contacting said workpiece splines through a single plane, said ring floating within said chamber for self-alignment and centering of said balls with the splines of said workpiece.

23. In the measuring gage of claim 15, said ring being rectangular in cross-section.

24. In the measuring gage of claim 15, said ring being adapted for limited axial and transverse movements within said chamber and corresponding movements of said balls.

25. In the measuring gage of claim 15, said locator being of hardened steel, said ring being of aluminum and said balls being of tungsten carbide brazed onto said pins.

26. In the measuring gage of claim 15, and a guard of inverted U-shaped loosely surrounding and protectively enclosing said dial indicator, and at its free ends secured to said cap flange.

* * * * *